H. E. TOWER.
MUSIC ROLL GEARING SHIFTER.
APPLICATION FILED MAY 7, 1920.

1,373,154.

Patented Mar. 29, 1921.

WITNESSES
Dorothy E. Dally
R. A. Duderstadt

INVENTOR:
Herschel E. Tower.

UNITED STATES PATENT OFFICE.

HERSCHEL E. TOWER, OF CINCINNATI, OHIO, ASSIGNOR TO THE BALDWIN COMPANY, OF CINCINNATI, OHIO.

MUSIC-ROLL GEARING-SHIFTER.

1,373,154. Specification of Letters Patent. Patented Mar. 29, 1921.

Application filed May 7, 1920. Serial No. 379,662.

*To all whom it may concern:*

Be it known that I, HERSCHEL E. TOWER, a citizen of the United States, residing at Cincinnati, in the county of Hamilton and State of Ohio, have invented certain new and useful Improvements in Music-Roll Gearing-Shifters, of which the following is a specification.

Various kinds of shift levers have been employed for shifting the gears or clutches from winding to rewinding position and from rewinding to winding position. Former levers have been of the pivoted lever type, rocker lever, or pneumatic swing levers, and have had arms or pins engaging slots in the gears or clutches, whereas the present invention is for a simple piece of flat stock that is made to engage both gears and clutches and is of much simpler form than heretofore used.

Figure 1:
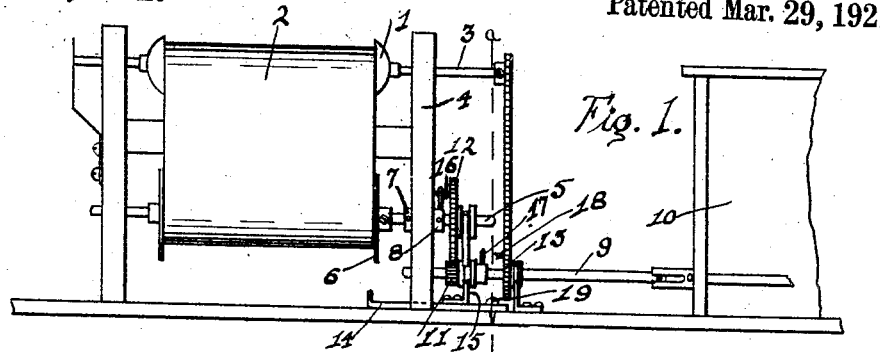
Figure 2:
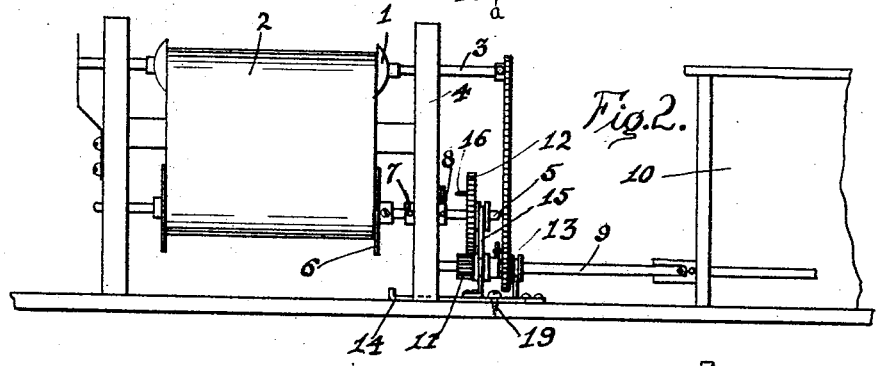
Figure 3:
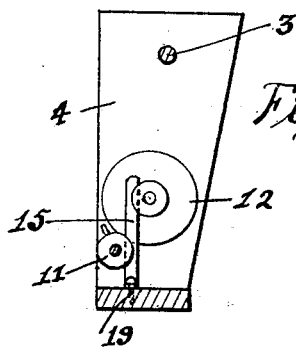
Figure 4:
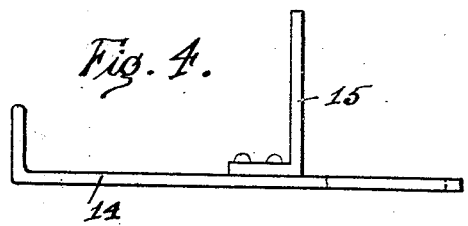
Figure 5:
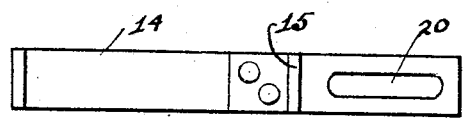

In the drawings, Figure 1 is a view of a roll box with gearing, spindles, shifter and motor for a mechanical musical instrument with the gearing, shifter and clutches in winding position. Fig. 2 is the same as Fig. 1, but shifted to a rewind position. Fig. 3 is an end view of the gears and shifter taken on line aa of Fig. 1. Fig. 4 is a side view of the shifter. Fig. 5 is a plan view of the shifter.

A music roll 1 carrying a music sheet 2 is engaged by a clutch shaft 3 mounted in the roll box 4, which also carries a shaft 5 and a take up roll 6 on which music sheet 2 is wound for forward playing. The shaft 5 is held from longitudinal motion on one side by the collar 7 and on the other by the clutch collar 8. A shaft 9 is slidably connected to the driving motor 10 which drives the shaft 9 and the pinion gear 11, thereby rotating either the winding gear 12 or rewinding sprocket 13 whichever is engaged. A shift handle 14 has a projection 15 which is mounted in such a position that it engages pinion gear 11 and winding gear 12 without the use of any pins or arms and cannot be gotten out of clutch except by taking the shafts out and removing the gears. To set the gearing in winding position shift handle 14—15 is moved over until clutch 16 on the gear 12 engages the clutch collar 8 and disengages the clutch 17 on the pinion gear 11 from the clutch 18 on the rewinding sprocket 13 and to set the gearing for rewind the operation is reversed. The shift handle 14 is held in a longitudinal slidable position by screw 19 set in slot 20 of the shift handle 14.

The advantages of this shifter over the other types are readily seen in the simplicity of manufacture and installation and also in the fact that it cannot get out of clutch.

What I claim as my invention is:

Winding gears and clutches; rewinding gears and clutches; shafts for carrying said gears and clutches; shifting means engaging the said gears and clutches; said shifting means slidably mounted parallel to said shafts; engaging means on said shifting means mounted at right angles to said shifting means and to said shafts and engaging both said winding gears and rewinding clutches.

May 1, 1920.

HERSCHEL E. TOWER.

Witnesses:
 PAUL J. HENGGE,
 NORMA HARRIS.